(12) United States Patent
Hoerz et al.

(10) Patent No.: US 11,190,063 B2
(45) Date of Patent: Nov. 30, 2021

(54) ELECTRICAL MACHINE

(71) Applicant: Mahle International GmbH, Stuttgart (DE)

(72) Inventors: Mirko Hoerz, Esslingen (DE); Hans-Ulrich Steurer, Stuttgart (DE); Josef Sonntag, Nuertingen (DE); Stojan Markic, Kojsko (SI); Andrej Licen, Branik (SI); Aleks Medvescek, Rence (SI); Peter Sever, Murska Sobota (SI); Philip Grabherr, Stuttgart (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/614,648

(22) PCT Filed: May 18, 2018

(86) PCT No.: PCT/EP2018/063139
§ 371 (c)(1),
(2) Date: Nov. 18, 2019

(87) PCT Pub. No.: WO2018/211087
PCT Pub. Date: Nov. 22, 2018

(65) Prior Publication Data
US 2020/0403463 A1      Dec. 24, 2020

(30) Foreign Application Priority Data

May 19, 2017    (DE) .......................... 102017208550.9

(51) Int. Cl.
*H02K 1/20* (2006.01)
*H02K 1/16* (2006.01)
(Continued)

(52) U.S. Cl.
CPC ................. *H02K 1/20* (2013.01); *H02K 1/16* (2013.01); *H02K 3/24* (2013.01); *H02K 5/1732* (2013.01); *H02K 9/00* (2013.01); *H02K 9/197* (2013.01)

(58) Field of Classification Search
CPC .. H02K 1/20; H02K 1/16; H02K 3/24; H02K 9/005; H02K 9/197; H02K 9/00; H02K 9/193
(Continued)

(56) References Cited

U.S. PATENT DOCUMENTS 2,390,130 A  * 12/1945  Sigmund .................. H02K 3/44
310/54
3,960,803 A     6/1976  Smith et al.
(Continued)

FOREIGN PATENT DOCUMENTS

CH       711 202 A2   12/2016
CN       1849737 A    10/2006
(Continued)

OTHER PUBLICATIONS

English abstract for DE-10 2012 221 325.
(Continued)

*Primary Examiner* — Tulsidas C Patel
*Assistant Examiner* — Robert E Mates
(74) *Attorney, Agent, or Firm* — Fishman Stewart PLLC (57) ABSTRACT

An electrical machine may include a rotor rotatable about an axis of rotation which defines an axial direction, a stator including a plurality of stator windings, a coolant collector chamber, and a coolant distributor chamber fluidically communicating with the coolant collector chamber via at least one cooling duct. At least one stator winding may be embedded into a plastic compound composed of an electrically insulating plastic. The stator may further include a
(Continued)

stator body having a space. The at least one cooling duct may be arranged in the stator body and may be at least partially defined by at least one aperture disposed in the stator body through which the coolant is flowable. The at least one aperture may open towards the space and may be closed in a fluid-tight manner via the plastic compound.

23 Claims, 5 Drawing Sheets (51) Int. Cl.
     *H02K 3/24*      (2006.01)
     *H02K 9/00*      (2006.01)
     *H02K 9/19*      (2006.01)
     *H02K 5/173*      (2006.01)
     *H02K 9/197*      (2006.01)

(58) Field of Classification Search
     USPC .................................................. 310/54, 52
     See application file for complete search history.

(56) References Cited

U.S. PATENT DOCUMENTS

| | | | |
|---|---|---|---|
| 4,388,543 A * | 6/1983 | Guimbal ................. | B60L 13/03 104/290 |
| 5,214,325 A | 5/1993 | Matson et al. | |
| 6,160,332 A | 12/2000 | Tsuruhara | |
| 7,365,469 B2 | 4/2008 | Wiker et al. | |
| 7,498,711 B2 | 3/2009 | Blais | |
| 8,698,361 B2 | 4/2014 | Stiesdal | |
| 9,847,702 B2 | 12/2017 | Lambert et al. | |
| 2006/0214531 A1* | 9/2006 | Wiker ................... | H02K 1/265 310/216.004 |
| 2008/0042498 A1 | 2/2008 | Beer | |
| 2009/0230806 A1* | 9/2009 | Miyata ................... | H02K 19/22 310/195 |
| 2011/0033321 A1* | 2/2011 | Mikkelsen .............. | H02K 5/15 417/410.1 |
| 2011/0101700 A1* | 5/2011 | Stiesdal ................. | H02K 1/148 290/55 |
| 2012/0001503 A1 | 1/2012 | Owng et al. | |
| 2012/0112569 A1* | 5/2012 | Le Besnerais ........... | H02K 9/19 310/54 |
| 2012/0161556 A1* | 6/2012 | Mizutani ................. | H02K 1/20 310/64 |
| 2013/0209239 A1* | 8/2013 | Karlsson ................ | F01D 25/12 415/117 |
| 2014/0091651 A1 | 4/2014 | Dorfstatter et al. | |
| 2014/0265662 A1 | 9/2014 | Shoykhet | |
| 2016/0181882 A1* | 6/2016 | Iwaki ..................... | H02K 3/345 310/215 |
| 2016/0294263 A1* | 10/2016 | Hashimoto ............. | H01F 41/10 |
| 2016/0359396 A1* | 12/2016 | Lambert ................ | B23K 31/12 |

FOREIGN PATENT DOCUMENTS

| | | |
|---|---|---|
| CN | 102055282 A | 5/2011 |
| DE | 60 2004 008 635 T2 | 6/2008 |
| DE | 10 2012 217 711 A1 | 4/2014 |
| DE | 10 2012 221 325 A1 | 5/2014 |
| DE | 10 2013 223059 A1 | 5/2015 |
| DE | 10 2014 215 916 A1 | 2/2016 |
| EP | 058 966 A2 | 9/1982 |
| EP | 1 841 043 A1 | 10/2007 |
| FR | 2 788 385 A1 | 7/2000 |
| JP | S49115613 U | 10/1974 |
| JP | S51043304 U | 3/1976 |
| JP | S60079237 U | 6/1985 |
| JP | 2003070199 A | 3/2003 |
| JP | 2003125547 A | 4/2003 |
| JP | 2004297924 A | 10/2004 |
| JP | 2005 354821 A | 12/2005 |
| WO | WO-2005/004309 A1 | 1/2005 |
| WO | WO-2017/070034 A1 | 4/2017 |

OTHER PUBLICATIONS

English abstract for DE-10 2014 215 916.
English abstract for JP-2005 354821.
English abstract for DE-10 2013 223059.
English abstract for EP-1 841 043-A1.
Chinese Office Action dated Jan. 29, 2021 for copending Chinese Application No. CN201880036984.5.
Japanese Office Action dated Aug. 3, 2021 for copending Japanese Patent Appl. No. 2019-563862 (with English translation).

* cited by examiner

ELECTRICAL MACHINE

CROSS-REFERENCE TO RELATED APPLICATIONS

This application claims priority to International Patent Application No. PCT/EP2018/063139, filed on May 18, 2018, and German Patent Application No. DE 10 2017 208 550.9, filed on May 19, 2017, the contents of both of which are hereby incorporated by reference in their entirety.

TECHNICAL FIELD

The invention relates to an electrical machine, in particular for a vehicle, as well as to a vehicle comprising such a machine.

BACKGROUND

Such electrical machines can generally be an electric motor or a generator. The electrical machine can be embodied as external rotor or as internal rotor.

A generic machine is known, for example, from U.S. Pat. No. 5,214,325. It comprises a housing, which surrounds an internal space and which has a jacket, which revolves in a circumferential direction of the housing and which radially limits the internal space, a rear side wall axially limiting the internal space axially on one side, and a front side wall axially limiting the internal space axially on the other side. A stator of the machine is fixedly connected to the jacked. A rotor of the machine is arranged in the stator, wherein a rotor shaft of the rotor is rotatably support on the front side wall via a front shaft bearing.

The stator of a conventional electrical machine typically comprises stator windings, which are electrically energized during operation of the machine. Heat is created thereby, which has to be dissipated in order to avoid an overheating and damages or even destruction of the stator associated therewith. For this purpose, it is known from conventional electrical machines to equip them with a cooling device for cooling the stator—in particular said stator windings. Such a cooling device comprises one or a plurality of cooling ducts, through which a coolant flows and which are arranged in the stator in the vicinity of the stator windings. Heat can be dissipated from the stator by means of heat transfer from the stator windings to the coolant.

JP 2004 297924 describes an electrical machine, which comprises a stator comprising stator windings and a rotor. At least one stator winding is thereby embedded into a plastic compound. A coolant distributor and a coolant collector chamber, which fluidically communicate via cooling ducts, are present at two axially opposite ends of the electrical machine.

U.S. Pat. No. 7,705,495 describes an electrical machine comprising a stator comprising stator windings. The stator windings are embedded into an electrically insulating plastic and two cooling ducts are arranged in the stator groove.

US 2008/042498, WO 2017/070034 A1, and WO 03/084028 A1 disclose electrical machines, which comprise a coolant distributor chamber and a coolant collector chamber, which are connected to one another via cooling ducts.

JP 2003 061285 A discloses an electrical machine comprising a rotor, a stator, comprising cooling ducts and comprising stator windings embedded into a plastic compound.

It proves to be disadvantageous thereby that an efficient heat transfer from the stator to the coolant, which flows through the respective cooling duct, is only associated with significant structural effort. This, however, has a disadvantageous effect on the production costs of the electrical machine.

SUMMARY

It is thus an object of the present invention to create an improved embodiment for an electrical machine, in the case of which this disadvantage is largely or even completely eliminated. In particular an improved embodiment for an electrical machine is to be created, which is characterized by an improved cooling of the stator windings of the stator.

This object is solved by means of the subject matter of the independent claim(s). Preferred embodiments are subject matter of the dependent patent claim(s).

It is thus the basic idea of the invention to embed the stator windings of an electrical machine, together with a cooling duct through which coolant can flow for cooling the stator windings, into a plastic compound of an electrically insulating plastic. The plastic can thus act as heat-transferring medium for transferring heat from the stator windings to the coolant on the one hand and as electrical insulator for the stator windings on the other hand. In particular a particularly good heat transfer between the stator windings and the coolant guided through the cooling duct is established in this way. This applies in particular when a plastic is used, which has a high thermal conductivity. In particular so-called thermoset plastics are suitable for this purpose. With the use of an electrically insulating plastic, it is simultaneously ensured that the stator windings to be cooled are not electrically short-circuited in an unwanted manner by means of the plastic.

The direct thermal coupling of the cooling duct comprising the coolant to the stator windings to be cooled with the help of the embedding of these two components into a plastic compound of plastic, which is essential for the invention, leads to a cooling of the stator windings, which is particularly effective as compared to conventional cooling devices. In the case of a high waste heat development in the stator, as it occurs, for example, in a high-load operation of the electrical machine, it can thus also be ensured that the arising waste heat can be dissipated from the stator. Damages to or even destruction of the electrical machine by overheating of the stator can thus be avoided. The production of the plastic compound, which is essential for the invention, can preferably take place by means of injection molding, in the case of which the stator windings to be cooled as well as the cooling duct are injection molded with the plastic so as to embody the plastic compound. The embedding of the stator windings and of the cooling duct into the plastic compound is thus very easy. This results in significant cost advantages for the production of the electrical machine according to the invention.

An electrical machine according to the invention, in particular for a vehicle, comprises a rotor, which can be rotated about an axis of rotation. The axis of rotation defines an axial direction of the electrical machine. The machine furthermore comprises a stator, which has a plurality of stator windings. The machine furthermore comprises a coolant distributor chamber and a coolant collector chamber, which is arranged at an axial distance to said coolant distributor chamber. The coolant distributor chamber thereby communicates fluidically with the coolant collector chamber by means of at least one cooling duct, through which a coolant can flow. A plurality of such cooling ducts are preferably provided between the coolant distributor chamber and the coolant collector chamber. According to the invention, the at least one stator winding for thermally coupling to the coolant is embedded at least in some areas into a plastic compound of an electrically insulating plastic.

According to a preferred embodiment, the stator can be embodied in a ring-shaped manner in a cross section perpendicular to the axial direction and has stator teeth, which extend along the axial direction and which are arranged spaced apart from one another along a circumferential direction of the stator, and which support the stator windings. In the case of this embodiment, the plastic compound comprising the at least one stator winding is arranged in a space, which is embodied between two stator teeth, which are adjacent in the circumferential direction. This measure ensures a particularly effective heat transfer between the stator windings and the cooling duct. In response to the production of the plastic compound, the space between the stator teeth can furthermore be used in the manner of a casting mold, into which the plastic of the plastic compound is injected. This simplifies the production of the plastic compound, because the provision of a separate casting mold can be forgone.

According to the invention, at least one cooling duct is arranged in the stator body and is formed by at least one aperture, through which the coolant can flow. Said aperture can be realized in the form of a through bore, which is introduced into the stator body by means of a suitable drilling tool in the course of the production of the electrical machine. The provision of a separate tube body or the like for limiting the cooling duct can be forgone in the case of this option. This is associated with reduced production costs. Particularly preferably, a plurality of such apertures is provided. The provision of a separate tube body or the like for limiting the cooling duct can be forgone in the case of this option. This is associated with reduced production costs. Said aperture can be realized in the form of a through bore, which is introduced into the plastic compound by means of a suitable drilling tool. The provision of a separate tube body or the like for limiting the cooling duct can be foregone in the case of this option. This is associated with reduced production costs.

Advantageously, the at least one cooling duct is arranged in the stator body in the area between two adjacent stator teeth with respect to the circumferential direction. This makes it possible to arrange the cooling duct close to the stator windings to be cooled, which improves the heat transfer from the stator windings to the cooling duct.

In the case of a further preferred embodiment, at least one cooling duct is arranged in the plastic compound. This measure ensures a particularly effective heat transfer between the stator windings and the cooling duct, because the cooling duct, which is arranged in the space, is in the immediate vicinity of the stator windings to be cooled. Advantageously, the cooling duct is limited, preferably completely, by the plastic compound.

In the case of a further preferred embodiment, the at least one cooling duct is formed by at least one, preferably by a plurality of aperture/apertures, which is/are provided in the plastic compound and through which the coolant can flow. This option can be realized particularly easily and is thus particularly cost-efficient.

Advantageously, at least one aperture can have the geometry of a rectangle comprising two broad sides and two narrow sides in a cross section perpendicular to the axial direction. In this way, the aperture is given the advantageous geometry of a flat tube, which, in turn, allows for an installation space-saving arrangement of the cooling duct in the immediate vicinity of the stator winding(s) to be cooled.

According to the invention, the aperture forming the cooling duct is embodied to be open towards the space. Said aperture is furthermore closed in a fluid-tight manner by the plastic compound, which is arranged in the space. In the case of this option, the apertures can be produced particularly easily, which is associated with cost advantages in the production.

According to a preferred embodiment, the coolant distributor chamber and/or the coolant collector chamber are at least partially arranged in the plastic compound and are also limited by the latter for the thermal coupling to the at least one stator winding. This provides for a particularly good heat transfer between the coolant distributor chamber or coolant collector chamber, respectively, and the stator windings, so that the coolant distributor chamber or coolant collector chamber, respectively, can also be used for the direct absorption of waste heat from the stator windings.

The plastic compound preferably protrudes axially, preferably on both sides, from the space. The plastic compound can thus also be used to at least partially limit the coolant distributor chamber or the coolant collector chamber, respectively. A removal of the plastic compound, which protrudes from the space, which is required in the course of the production of the machine, can in particular be forgone, which is associated with cost advantages in the production of the machine. A further advantageous embodiment thus proposes that the at least one plastic compound at least partially limits the coolant distributor chamber and/or the coolant collector chamber.

According to a preferred embodiment, the plastic compound arranged in the space consists of a single plastic material. In the case of this embodiment, an additional electrical insulation of an electrically insulating material is arranged in the space, preferably between the stator winding or plastic compound, respectively, and the stator tooth. Due to the fact that only a single plastic material has to be introduced into the spaces in the case of this embodiment, the production of the plastic compound of this plastic can take place in a single injection molding step. The production of the plastic compound is thus particularly easy, which is associated with cost advantages.

The plastic compound advantageously fills the space essentially completely. The embodiment of unwanted spaces, for instance in the manner of air gaps, which would lead to a reduction of the heat transfer, are avoided in this way.

Advantageously, the electrically insulating plastic of the plastic compound comprises a thermoset or is a thermoset. The electrically insulating plastic of the plastic compound can alternatively comprise a thermoplastic or can be a thermoplastic. A combination of a thermoset and a thermoplastic is also conceivable in a further option.

Advantageously, at least one cooling duct and the plastic compound can in each case be provided in at least one space, preferably in each space, between two stator teeth, which are each adjacent in the circumferential direction. It is ensured in this way that operationally generated waste heat can be dissipated from all of the stator stator windings, which are present.

A preferred embodiment proposes to embody the at least one cooling duct as tube body, which surrounds a tube body internal space. In the case of this option, at least one separating element, which divides the tube body internal space into at least two partial cooling ducts, which are fluidically separated from one another, is molded on the tube body. The tube body can be stiffened by means of said separating elements, so that its mechanical strength is increased.

An advantageous further development proposes to embody the tube body as flat tube, which extends along the axial direction and which has two broad sides and two narrow sides in a cross section perpendicular to the axial direction. A length of the two broad sides can thereby preferably be at least four times, preferably at least ten times, a length of the two narrow sides. In the case of this further development, at least one broad side of the flat tube extends essentially perpendicular to the radial direction in the cross section perpendicular to the axial direction.

According to a further preferred embodiment, the coolant distributor chamber and/or the coolant collector chamber are embodied by means of a hollow space, which is at least partially, preferably completely present in the plastic compound. The provision of a separate casing or of a housing, respectively, for limiting the coolant distributor chamber or coolant collector chamber, respectively, can thus be forgone. This is associated with significant cost advantages.

Particularly preferably, the plastic compound is an injection molding compound of an electrically insulating plastic. The use of an injection molding method simplifies and accelerates the production of the plastic compound. This leads to cost advantages in the production of the electrical machine.

In the case of an advantageous further development, the plastic compound of the electrically insulating plastic is also arranged on an outer circumferential side of the stator body, and a plastic coating is preferably embodied on this outer circumferential side. The stator can thus be electrically insulated against the surrounding area. The provision of a separate housing for accommodating the stator body can thus be forgone. A coating of at least one or of both front sides of the stator body with the plastic compound is also conceivable in an optional option. In a further option, the plastic compound can encase the stator body, preferably completely.

According to a preferred embodiment, the plastic compound at least partially surrounds at least one winding section of the stator winding, which protrudes axially from the space of the stator body, and thereby partially limits the coolant distributor chamber and/or the coolant collector chamber, so that the winding section is electrically insulated with respect to the coolant. An unwanted electrical short-circuit of the coolant with the stator winding during operation of the electrical machine is prevented in this way.

According to an advantageous further development, the coolant distributor chamber fluidically communicates with the coolant collector chamber by means of a plurality of cooling ducts.

Advantageously, the plurality of cooling ducts extends, at a distance from one another, along the axial direction. This measure ensures that all axial sections of the stator windings are cooled.

The cooling ducts are preferably arranged at a distance from one another along a circumferential direction of the stator. This measure ensures that all stator windings are cooled along the circumferential direction.

According to another preferred embodiment, the coolant distributor chamber and/or coolant collector chamber is exclusively arranged in an axial extension of the stator body adjacent to the latter. In the case of this embodiment, the coolant distributor chamber or the coolant collector chamber, respectively, preferably does not protrude beyond the stator body or the stator, respectively, along a radial direction thereof. This embodiment only requires very little installation space in the radial direction.

At least one stator winding is particularly preferably embodied in such a way that it is electrically insulated from the coolant and from the stator body at least in the area inside the respective space during operation of the electrical machine. This applies particularly preferably for all stator windings of the electrical machine. An unwanted electrical short-circuit of the stator winding with the stator body or—during operation of the electrical machine—with the coolant, respectively, is prevented in this way.

This electrical insulation of the at least one stator winding from the stator body, preferably also from the stator teeth limiting the space, is particularly preferably formed completely by the plastic compound and/or by the additional insulator—as already mentioned above. The provision of a further electrical insulator can be forgone in this way.

According to another preferred embodiment, the additional electrical insulation inside the space extends over the entire length of the space, measured along the axial direction, so that it insulates the stator winding from the stator body and from the stator teeth limiting the space.

According to an advantageous further development, the additional electrical insulation surrounds the stator winding inside the space over at least the entire length of the space along the circumference thereof.

In the case of a particularly preferred embodiment, the at least one stator winding is also electrically insulated from the cooling duct, which is embodied as tube body. The electrical insulation is thereby formed by the plastic compound and/or the additional insulation.

The stator windings are particularly preferably part of a distributed winding.

The invention further relates to a vehicle, in particular a motor vehicle, comprising an above-presented electrical machine. The above-described advantages of the electrical machine can thus also be transferred to the vehicle according to the invention.

Further important features and advantages of the invention follow from the subclaims, the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description.

BRIEF DESCRIPTION OF THE DRAWINGS

In each case schematically.

DETAILED DESCRIPTION

Figure 1:
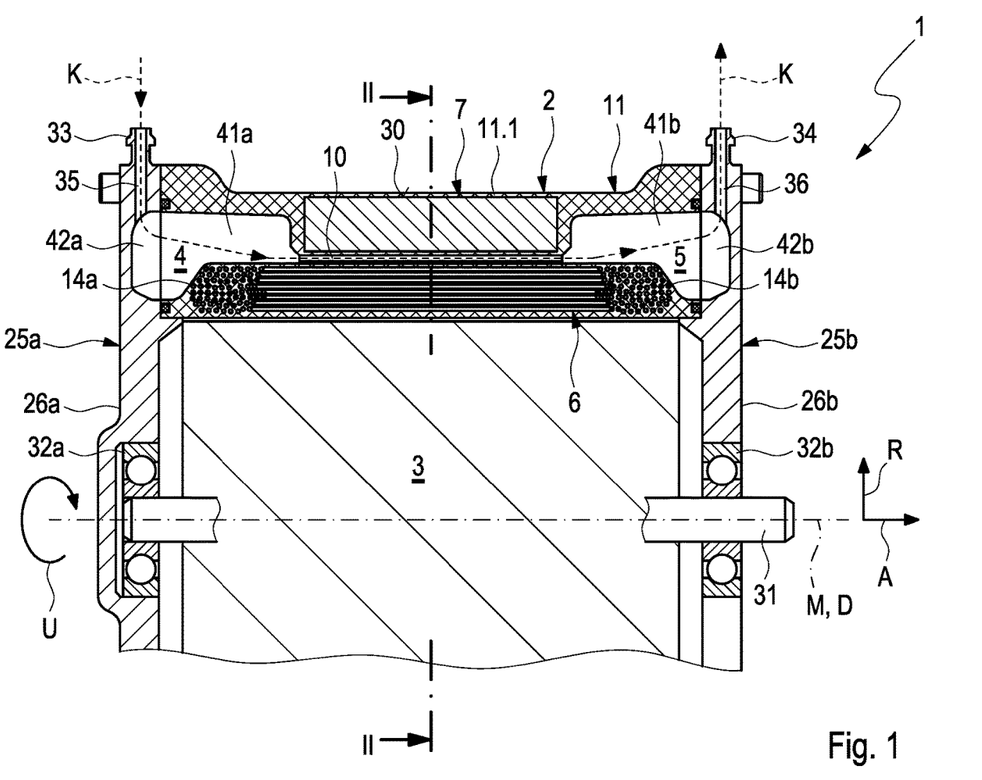
FIG. 1 shows an example of an electrical machine according to the invention in a longitudinal section along the axis of rotation of the rotor.
Figure 2:
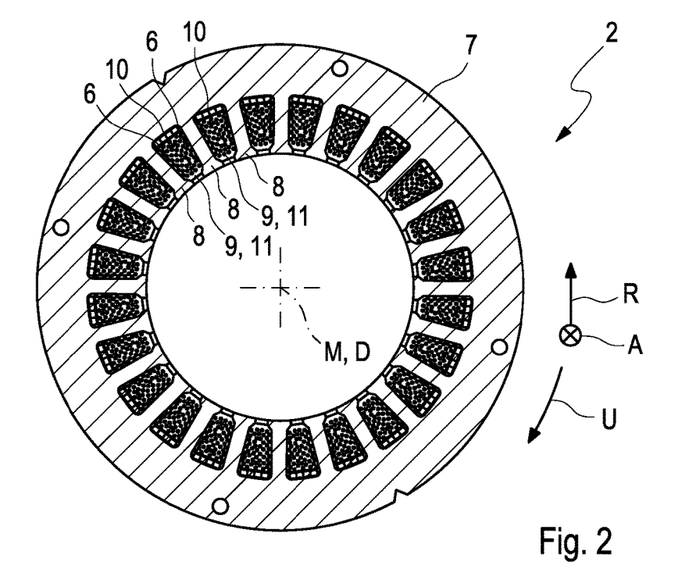
FIG. 2 shows the stator of the electrical machine according to FIG. 1 in a cross section perpendicular to the axis of rotation of the rotor.

FIG. 1 illustrates an example of an electrical machine 1 according to the invention in a sectional illustration. The electrical machine 1 is dimensioned in such a way that it can be used in a vehicle, preferably in a road vehicle. The electrical machine 1 comprises a rotor 3, which is only illustrated in a roughly schematic manner in FIG. 1, and a stator 2. For clarification purposes, the stator 2 is illustrated in FIG. 2 in a cross section perpendicular to the axis of rotation D along the sectional line II-II of FIG. 1 in a separate illustration. According to FIG. 1, the rotor 3 has a rotor shaft 31 and can have a plurality of magnets, which are not illustrated in more detail in FIG. 1, the magnetic polarization of which alternates along the circumferential direction U. The rotor 3 can be rotated about an axis of rotation D, the position of which is determined by the center longitudinal axis M of the rotor shaft 31. The axis of rotation D defines an axial direction A, which extends parallel to the axis of rotation D. A radial direction R is perpendicular to the axial direction A. A circumferential direction U rotates around the axis of rotation D.

As can be seen in FIG. 1, the rotor 3 is arranged in the stator 2. The electrical machine 1 shown here is thus a so-called internal rotor. However, a realization as so-called external rotor is also conceivable, in the case of which the rotor 3 is arranged outside of the stator 2. The rotor shaft 31 is supported on the stator 2 in a first shaft bearing 32a and, axially spaced apart therefrom, in a second shaft bearing 32b so as to be rotatable around the axis of rotation D. In the known manner, the stator 2 furthermore comprises a plurality of stator windings 6, which can be electrically energized so as to generate a magnetic field. The rotor 3 is set into rotation by means of magnetic interaction of the magnetic field, which is generated by the magnets of the rotor 3, with the magnetic field, which is generated by the electrically conductive stator windings 6.

It can be gathered from the cross section of FIG. 2 that the stator 2 can have a ring-shaped stator body 7, for example of iron. The stator body 7 can in particular be formed of a plurality of stator body plates (not shown), which are stacked on top of one another along the axial direction A and which are adhered to one another. A plurality of stator teeth 8, which extend along the axial direction A, protrude away from the stator body 7 radially to the inside, and which are arranged spaced apart from one another along the circumferential direction U, are molded on the stator body 7 radially on the inside. Each stator tooth 8 supports a respective stator winding 6. Together, the individual stator windings 6 form a winding arrangement. Depending on the number of the magnetic poles, which are to be formed by the stator windings 6, the individual stator windings 6 of the entire stator winding arrangement can be electrically wired together in a suitable manner.

During operation of the machine 1, the electrically energized stator windings 6 generate waste heat, which has to be dissipated from the machine 1, in order to prevent an overheating of the stator 2 and damages to or even destruction of the machine 1 associated therewith. The stator windings 6 are thus cooled with the help of a coolant K, which is guided through the stator 2 and which can absorb the waste heat generated by the stator windings 6 by means of heat transfer. To guide the coolant K through the stator 2, the machine 1 comprises a coolant distributor chamber 4, into which the coolant K can be introduced via a coolant inlet 33. Along the axial direction A, a coolant collector chamber 5 is arranged at a distance from the coolant distributor 4. The coolant distributor chamber 4 communicates fluidically with the coolant collector chamber 5 by means of a plurality of cooling ducts 10, of which only a single one can be seen in the illustration of FIG. 1. In a cross section perpendicular to the axial direction A, which is not shown in the figures, the coolant distributor chamber 4 and the coolant collector chamber 5 can each have a ring-shaped geometry. A plurality of cooling ducts 10, which each extend along the axial direction A, are arranged at a distance from one another along the circumferential direction U. The coolant K introduced into the coolant distributor chamber 4 via the coolant inlet 33 can thus be distributed to the individual cooling ducts 10. After the flow-through of the cooling ducts 10 and the associated absorption of heat from the stator windings, the coolant K can be collected in the coolant collector chamber 5 and can be discharged from the machine 1 again via a coolant outlet 34 provided on the stator 2.

As can be seen in the illustrations of FIGS. 1 and 2, the stator windings 6 are arranged in spaces 9, which are in each case embodied between two stator teeth 8, which are adjacent in the circumferential direction U. Said spaces 9 are also known to the pertinent person of skill in the art as so-called "stator grooves" or "stator slots", which extend along the axial direction A, as do the stator teeth 8.

Particular attention shall now be paid to the illustration of FIG. 3, which shows a space 9 embodied between two stator teeth 8—hereinafter also referred to as stator teeth 8a, 8b—which are adjacent in the circumferential direction U, in a detail illustration. To improve the heat transfer of the waste heat generated by the stator windings 6 to the coolant K flowing through the cooling ducts 10, a plastic compound 11 of an electrically insulating plastic is in each case provided in the spaces 9 in accordance with FIG. 3. Particularly preferably, the plastic compound 11 is an injection molding compound of an electrically insulating plastic. The use of an injection molding method simplifies and accelerates the production of the plastic compound. The cooling duct 10 arranged in the space 9 and the stator windings 6 arranged in the same space 9 are embedded into the plastic compound 11, which can consist, for example of a thermoset or thermoplastic or which can comprise a thermoset or thermoplastic, respectively. In the case of the example of FIG. 3, a plastic compound 11 of a single plastic material is provided in the space 9.

Figure 3:
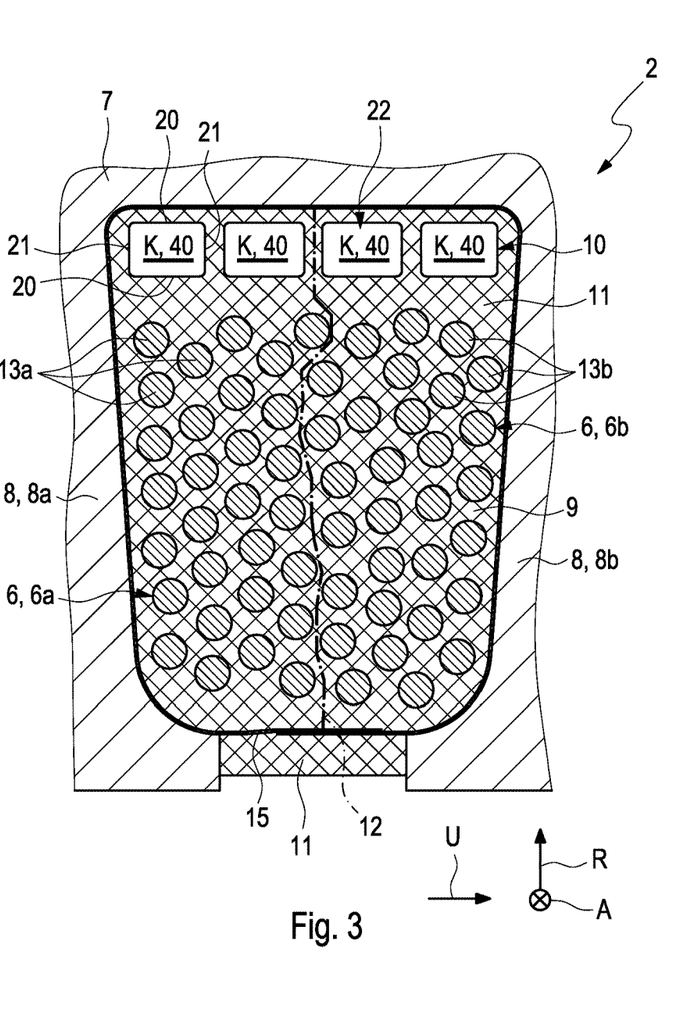
FIG. 3 shows a detail of the stator of FIG. 2 in the area of a space between two stator teeth, which are adjacent in the circumferential direction.

It goes without saying that the stator winding 6, which is arranged in the space 9 according to FIG. 3, in each case partially belongs to a first stator winding 6a, which is supported by a first stator tooth 8a, and which is partially assigned to a second stator winding 6b, which is supported by a second stator tooth 8b, which is adjacent to the first stator tooth 8a in the circumferential direction U. To clarify this scenario, a possible virtual separating line 12 is delineated in FIG. 3. The stator winding wires 13a shown to the left of the separating line 12 in FIG. 3 belong to the stator winding 6a, which is supported on the stator tooth 8a. The stator winding wires 13*b* shown to the right of the separating line 12 thus belong to the stator winding 6*b*, which is supported by the second stator tooth 8*b*.

In the example of FIG. 3, the cooling duct 10, which is embodied in a respective space 9, is realized by means of a plurality of apertures 40, which are provided in the plastic compound 11 and through which the coolant K can flow. The apertures 40—four such apertures 40 are shown merely in an exemplary manner in FIG. 3—are arranged spaced apart from one another along the circumferential direction U and each extend along the axial direction A. The apertures 40 can be realized as through bores, which are introduced into the plastic compound 11 by means of a suitable drilling tool. The apertures 40 can each have the geometry of a rectangle comprising two broad sides 20 and comprising two narrow sides 21 in the cross section perpendicular to the axis of rotation D. A length of the two broad sides 20 is thereby at least twice, preferably at least four times, a length of the two narrow sides 21. The advantageous geometry of a flat tube is thus simulated.

As the detail illustration of FIG. 3 further shows, an additional electrical insulation 15 of an electrically insulating material is arranged in the respective space 9 between the plastic compound 11 and the stator body 7 or the two stator teeth 8, respectively, which limit the space 9 in the circumferential direction U. In the event that the plastic compound 11 cracks due to thermal overload or is damaged in another way, an unwanted electrical short-circuit of the respective stator winding 6 can be avoided in this way by means of the material of the stator body 7 or of the stator teeth 8, respectively—typically iron or another suitable, electrically conductive material. An electrical insulation 15 of paper proves to be particularly cost-efficient.

In the example of FIGS. 1 to 3, the apertures 40 forming the cooling duct 10 are arranged in the plastic compound 11 radially outside of the stator windings 6 with respect to the radial direction R. The radial distance of the cooling duct 10 to the axis of rotation D of the rotor 3 is thus larger than the distance of the stator winding 6 to the axis of rotation D. In the cross section perpendicular to the axial direction A shown in FIG. 3, the two broad sides 20 of the apertures 40 each extend perpendicular to the radial direction R.

To produce an electrical machine 1 according to FIGS. 1 to 3, the electrical insulation 15, for example of paper, is initially inserted into the spaces 9. The stator windings 6 are then introduced into the spaces 9 and are injection molded with the plastic, for example a thermoset, resulting in the plastic compound 11. The apertures 40 forming the cooling duct 10 are subsequently introduced into the plastic compound 11 with the help of a suitable drilling tool. The stator body 7 can also be injection molded with the plastic resulting in the plastic compound 11, thus in particular with the thermoset, in the course of the production of the plastic compound 11.

Figure 4:
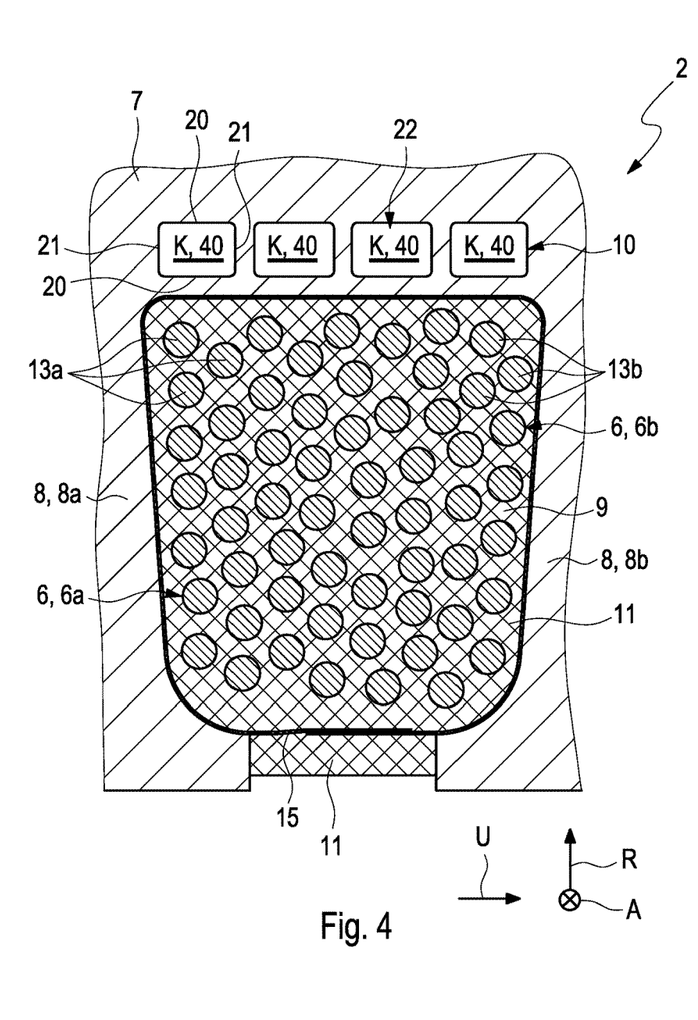
FIGS. 4 through 6 show options of the exemplary embodiment of FIG. 3.

FIG. 4 shows an option of the example of FIG. 3. In the case of the machine 1 according to FIG. 4, the cooling duct 10 is not arranged in the plastic compound 11, but in the stator body 7 of the stator 2. As can be seen in FIG. 4, the apertures 40 forming the cooling duct 10 are arranged in the stator body 7 radially outside the space 9 and between two adjacent stator teeth 8*a*, 8*b* with respect to the circumferential direction U. Analogously to the example of FIG. 3, the cooling duct 10 is formed by the apertures 40, which are provided in the stator body 7. The cooling duct 10 can thus be formed by introducing the apertures 40 into the stator body 7 or into the stator body plates forming the stator body 7, respectively—preferably in the form of bores with the help of a suitable drilling tool—in the course of the production of the stator body 7.

Figure 5:
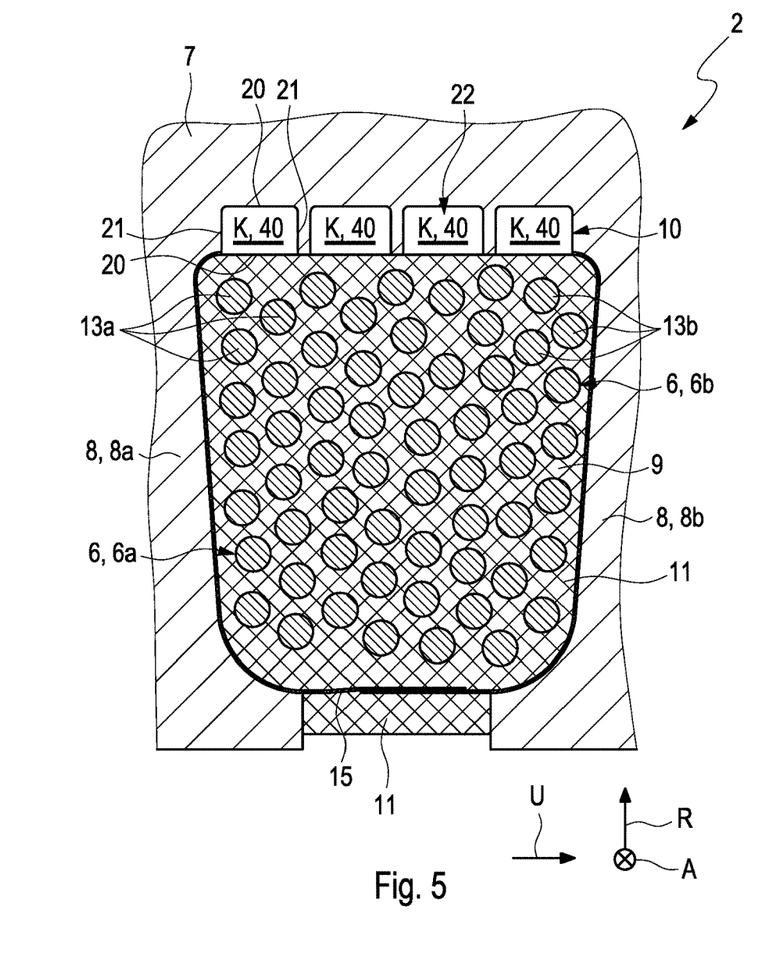

FIG. 5 shows an option of the example of FIG. 4. In the case of the option according to FIG. 5, the apertures 40 forming the cooling duct 10 are also arranged in the stator body 7 of the stator 2. In the example of FIG. 5, the apertures 40 arranged in the stator body 7 are embodied so as to be open towards the space 9. As can be seen in FIG. 5, the apertures 40 are closed in a fluid-tight manner towards the space 9 and by the plastic compound 11 provided in the space 9.

Figure 6:
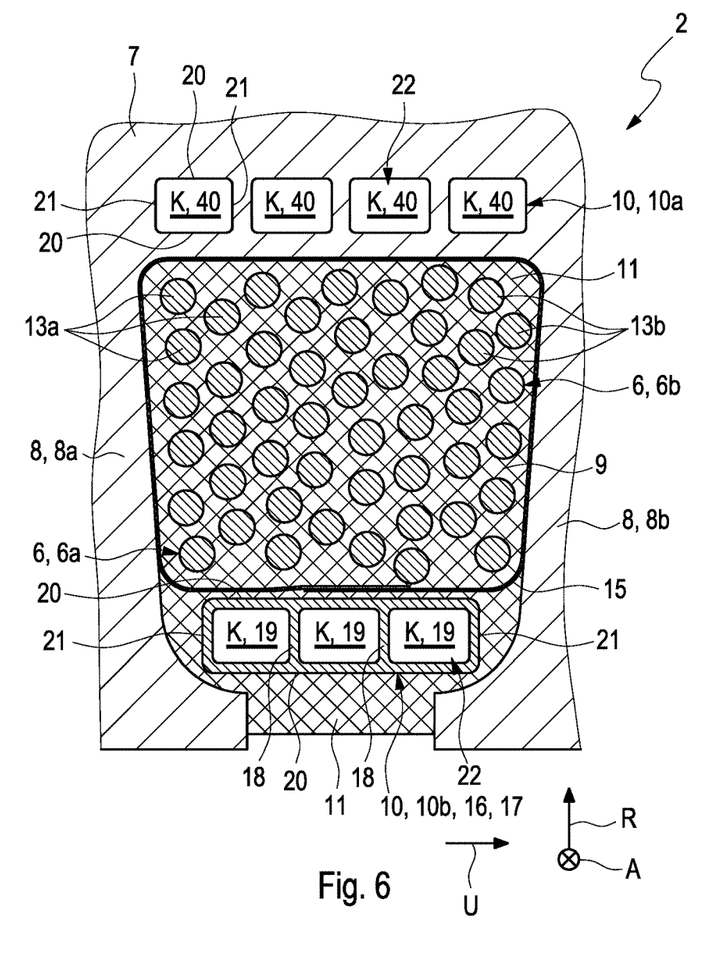

FIG. 6 shows a further development of the example of FIG. 5. In the case of the machine 1 according to FIG. 6, a cooling duct 10 is provided in the stator body 7 as well as in the plastic compound 11. The cooling duct 10 additionally provided in the stator body 7—hereinafter also referred to as "radially outer cooling duct" 10*a*—is embodied analogously to the example of FIG. 5, so that reference is made to the above description relating to FIG. 5. The cooling duct 10 arranged in the plastic compound 11 will also be referred to hereinafter as "radially inner cooling duct" 10*b*. With respect to the radial direction R, the stator winding 6 is thus arranged between the two cooling ducts 10*a*, 10*b*. As shown by the detail illustration of FIG. 6, the radially outer cooling duct 10*b* can be formed by a tube body 16, for example of aluminum, which surrounds a tube body internal space 22. As shown in the detail illustration of FIG. 6, one or a plurality of separating elements 18, which divide the cooling duct 10 into partial cooling ducts 19, which are fluidically separated from one another, can optionally be molded on the tube body 16. The flow behavior of the coolant K in the cooling duct 10 can be improved in this way, which is associated with an improved heat transfer to the coolant. The tube body 16 is furthermore additionally stiffened mechanically. In the example of FIG. 6, two such separating elements 18 are illustrated in an exemplary manner, so that three partial cooling ducts 19 result. It goes without saying that a different number of separating elements 18 is also possible in options of the example. The tube body 16 can be embodied as flat tube 17, which has two broad sides 20 and two narrow sides 21 in the cross section perpendicular to the axial direction A. A length of the two broad sides 20 is at least four times, preferably at least ten times, a length of the two narrow sides 21 in this case. The broad sides 20 extend perpendicular to the radial direction R.

The above-discussed options according to FIGS. 3 to 6 can be combined with one another, where useful.

Reference will be made again below to the illustration of FIG. 1. As FIG. 1 clearly illustrates, the plastic compound 11, which is embodied in one piece, can axially protrude from the spaces 9 on both sides. This allows to also embed the coolant distributor chamber 4 as well as, alternatively or additionally, the coolant collector chamber 5 into the plastic compound 11 for the thermal coupling to axial end sections 14*a*, 14*b* of the stator windings 6, which are arranged axially outside of the respective space 9. In the case of this embodiment option, the plastic compound 11 thus in each case at least partially limits the coolant distributor chamber 4 as well as the coolant collector chamber 5. An effective heat transfer to the coolant K, which is present in the coolant distributor chamber 4 or coolant collector chamber 5, respectively, can also be established in this way in the area of the axial end sections 14*a*, 14*b* of the stator windings 6, which are usually thermally loaded in a particular manner. This measure allows for a particularly effective cooling of the two axial end sections 14*a*, 14*b* of the stator windings 6.

According to FIG. 1, the stator 2 comprising the stator body 7 and the stator teeth 8 is further axially arranged between a first and a second bearing shield 25a, 25b. As can be seen in FIG. 1, a portion of the coolant distributor chamber 4 is arranged in the first bearing shield 25a and a portion of the coolant collector chamber 5 in the second bearing shield 25b. The coolant distributor chamber 4 and the coolant collector chamber 5 are thus each partially formed by a hollow space 41a, 41b, which is provided in the plastic compound 11. The first hollow space 41a is thereby supplemented with a hollow space 42a embodied in the first bearing shield 25a to form the coolant distributor chamber 4. The second hollow chamber 41b is accordingly supplemented with a hollow space 42b embodied in the second bearing shield 25b to form the coolant collector chamber 5. In the case of the above-described embodiment option, the plastic compound 11 thus at least partially limits the coolant distributor chamber 4 as well as the coolant collector chamber 5.

A coolant supply 35, which fluidically connects the coolant distributor chamber 4 to a coolant inlet 33, which is provided on the first bearing shield 25a on the outside, in particular circumferentially as illustrated in FIG. 1, can further be embodied in the first bearing shield 25a. A coolant discharge 36, which fluidically connects the coolant collector chamber 5 to a coolant outlet 34, which is provided on the bearing shield 25b on the outside, in particular circumferentially as illustrated in FIG. 1, can accordingly be embodied in the second bearing shield 25b. This provides for an arrangement of the coolant distributor chamber 4 or of the coolant collector chamber 5, respectively, radially on the outside of the first or second end section 14a, 14b, respectively, of the respective stator winding 6 and also in the extension of these end sections 14a, 14b along the axial direction A. The end sections 14a, 14b of the stator windings 6, which are particularly loaded thermally during operation of the machine 1, are cooled particularly effectively by means of this measure.

According to FIG. 1, the plastic compound 11 of the electrically insulating plastic can also be arranged on an outer circumferential side 30 of the stator body 7 and can thus embody a plastic coating 11.1 on the outer circumferential side 30. The stator body 7 of the stator 2, which is typically formed of electrically conductive stator plates, can thus be electrically insulated against the surrounding area. The provision of a separate housing for accommodating the stator body 7 can thus be foregone.

Figure 7:
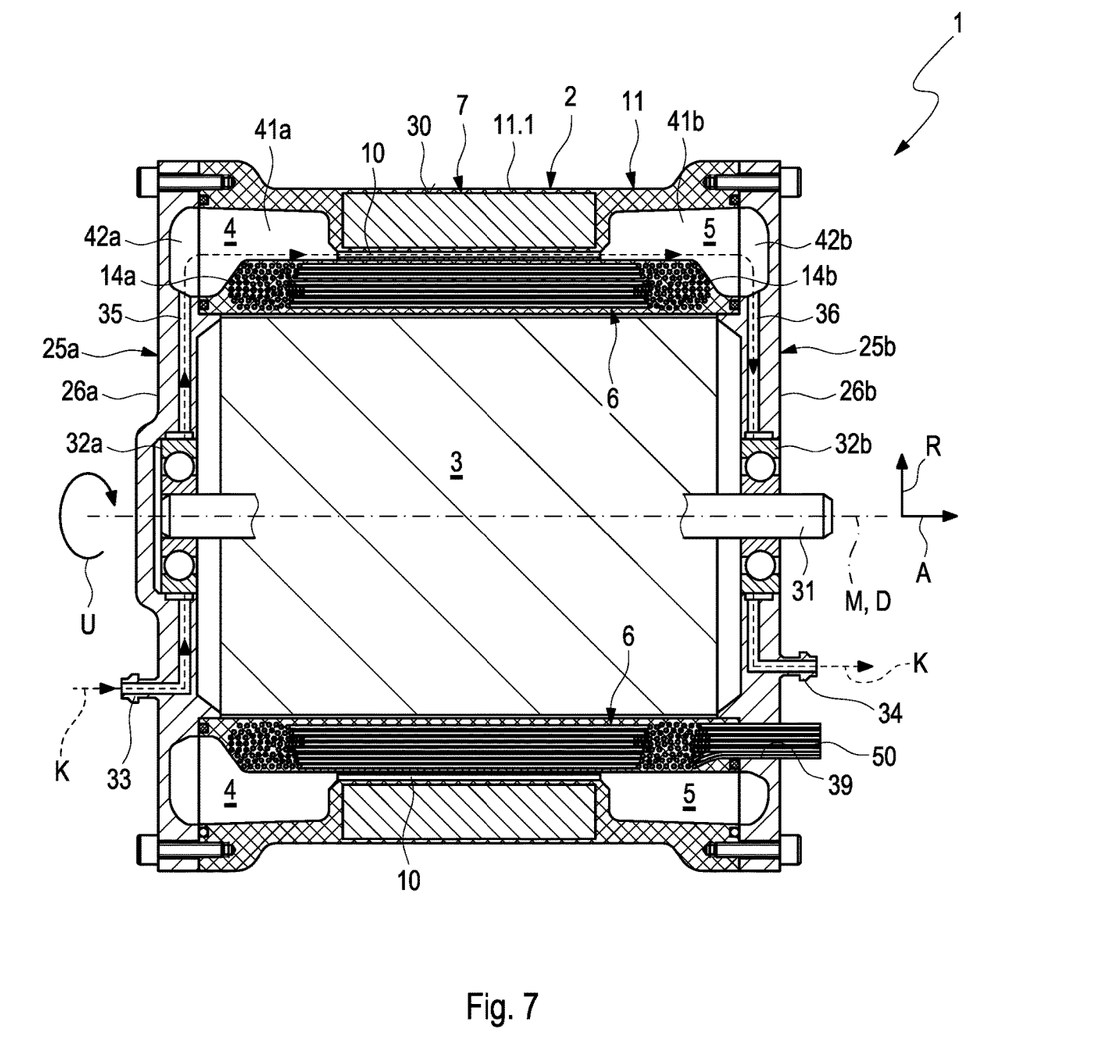
FIG. 7 shows a first option of the electrical machine of FIG. 1, in the case of which the coolant flowing through the cooling ducts is also used to cool the shaft bearings of the rotor.

FIG. 7 shows an option of the example of FIG. 1. To also cool the rotor shaft 31 as well as the two shaft bearings 32a, 32b during operation of the machine 1, the coolant supply 35 can be thermally coupled to the first shaft bearing 32a, which is arranged in the first bearing shield 25a. The coolant discharge 36 can likewise be thermally coupled to the second shaft bearing 32b, which is arranged in the second bearing shield 25b. A separate cooling device for cooling the shaft bearings 32a, 32b can be forgone in this way, which results in cost advantages. In the example of FIG. 7, the coolant inlet 33 and the coolant outlet 34 are provided at the outer front side 26a, 26b of the respective bearing shield 25a, 25b. In the case of the option according to FIGS. 7 and 1, the stator windings 6 are arranged radially inside the cooling ducts 10 along the radial direction R. The stator windings 6 are guided out of the stator 2 to the outside by means of an electrical connection 50 through a feedthrough 39 provided in the second bearing shield 25b, so that they can be electrically energized from the outside. The feedthrough 39 is arranged radially between the coolant distributor chamber 4 or the coolant collector chamber 5, respectively, and the axis of rotation D.

Figure 8:
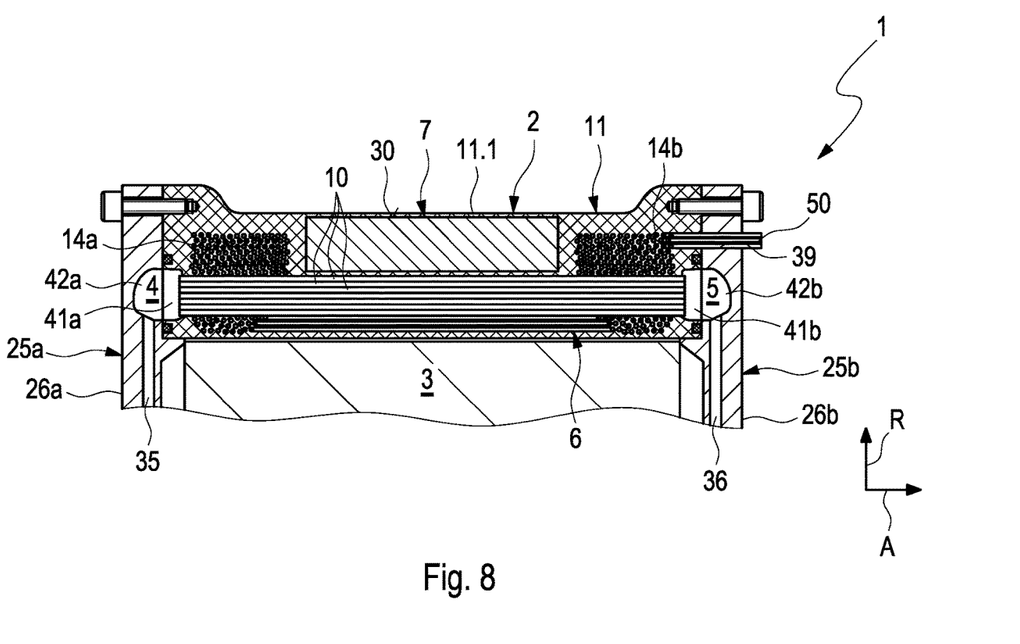
FIG. 8 shows a second option of the electrical machine according to FIG. 1, which requires particularly little installation space.

In the example of FIG. 8, which shows a simplified embodiment as compared to FIG. 7, the coolant distributor chamber 4 and the coolant collector chamber 5 are arranged exclusively in the axial extension of the cooling ducts 10. This option requires particularly little installation space for the coolant distributor chamber 4 and for the coolant collector chamber 5. In the case of the option according to FIG. 8, the stator windings 6 are arranged radially inside the cooling ducts 10 along the radial direction R. The stator windings 6 are guided out of the stator 2 to the outside by means of an electrical connection 50 through a feedthrough 39 provided in the second bearing shield 25b, so that they can be electrically energized from the outside. The feedthrough 39 is arranged in the second bearing shield 25b radially outside of the coolant distributor chamber 4 or the coolant collector chamber 5, respectively, with respect to the radial direction.

Figure 9:
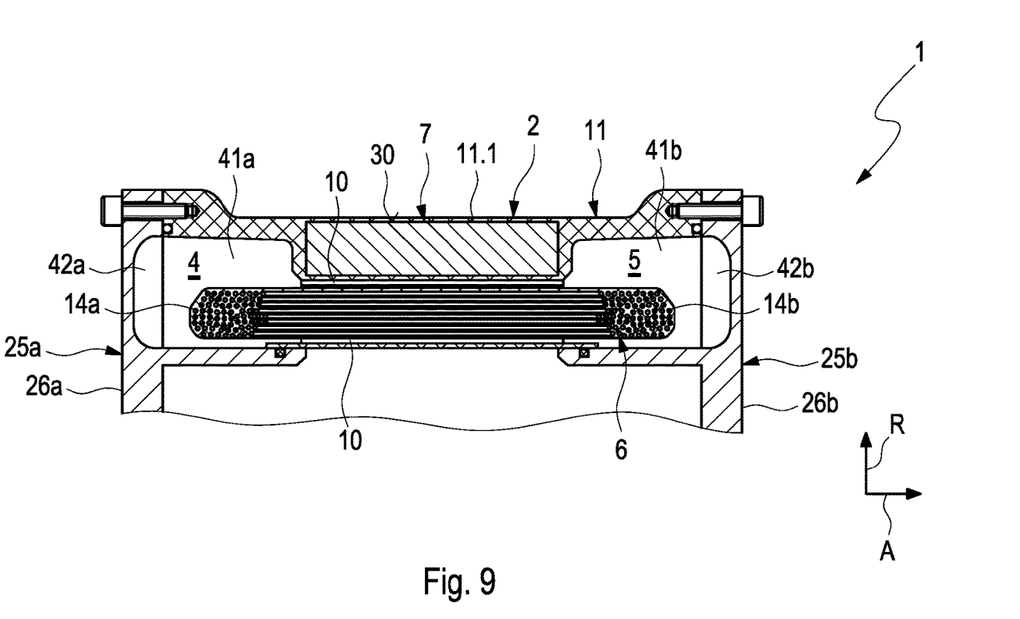
FIG. 9 shows a third option of the machine according to FIG. 1, which provides for a particularly effective cooling of the stator windings.

A further development of FIG. 7 is shown in the example of FIG. 9. In the case of this further development, the coolant distributor chamber 4 surrounds the first axial end section 14a of the respective stator winding 6 in a U-shaped manner, thus axially on the end side as well as radially on the inside and radially on the outside, in the longitudinal section along the axis of rotation D illustrated in FIG. 9. The coolant collector chamber 5 accordingly surrounds the second axial end section 14b of the respective stator winding 6 in a U-shaped manner, thus axially on the end side as well as radially on the inside and radially on the outside, in the longitudinal section along the axis of rotation D. In the case of this option, cooling ducts 10 are provided radially inside as well as radially outside of the stator winding 6. The respective stator windings 6, including their axial end sections 14a, 14b, are thus in direct thermal contact with the coolant K via the cooling ducts 10 as well as the coolant distributor chamber 4 as well as the coolant collector chamber 5. This allows for a particularly effective cooling of the stator winding 6 including the axial end sections 14a, 14b, which are subjected to special thermal loads.

The plastic compound 11 can also surround the winding section of the stator winding 6, which protrudes axially from the space 9 of the stator body, and can thereby partially limit the coolant distributor chamber 4 or the coolant collector chamber 5, respectively, so that the respective stator winding 6 or the respective winding section, respectively, of the stator winding 6 is electrically insulated with respect to the coolant, when said coolant flows through the respective cooling duct 10 during operation of the machine 1.

The coolant distributor chamber 4 as well as the coolant collector chamber 5 are advantageously arranged in an axial extension of the stator body 7 adjacent to the latter. The coolant distributor chamber 4 or the coolant collector chamber 5, respectively, preferably does not protrude beyond the stator body 7 or stator 2, respectively, along the radial direction R thereof.

The stator winding 6 is in each case embodied in such a way that it is electrically insulated from the coolant K and from the stator body 7 of the stator 2 at least in the area inside the respective space 9 during operation of the electrical machine 1. An unwanted electrical short-circuit of the stator winding 6 with the stator body 7—during operation of the electrical machine 1—with the coolant K is prevented in this way. Such an electrical insulation of the stator winding 6 with respect to the stator body 7, preferably also with respect to the stator teeth 8 limiting the space 9, is advantageously formed completely by the plastic compound and/or by the additional electrical insulation 15—as already mentioned above.

The additional electrical insulation 15 inside the space 9 advantageously extends over the entire length of the space 9, measured along the axial direction A, so that it insulates the stator winding 6 from the stator body 7 and or from the stator teeth 8, respectively.

The additional electrical insulation 15 advantageously surrounds the stator winding 6 inside the space 9 over at least the entire length of the space 9 along the circumferential limitation thereof.

The stator winding 6 is advantageously also electrically insulated from the cooling duct, which is embodied as tube body 16. The electrical insulation is thereby formed by means of the plastic compound as well as, alternatively or additionally, the additional electrical insulation 15.

The invention claimed is:

1. An electrical machine, comprising:
a rotor rotatable about an axis of rotation which defines an axial direction;
a stator including a plurality of stator windings;
a coolant distributor chamber and a coolant collector chamber arranged at an axial distance from the coolant distributor chamber, the coolant distributor chamber, for cooling the plurality of stator windings, fluidically communicating with the coolant collector chamber via at least one cooling duct through which a coolant is flowable;
at least one stator winding of the plurality of stator windings, for thermally coupling, embedded into a plastic compound composed of an electrically insulating plastic;
the stator further including a stator body having a space;
wherein the at least one cooling duct is arranged in the stator body and is at least partially defined by at least one aperture disposed in the stator body through which the coolant is flowable;
wherein the at least one aperture opens towards the space and is closed in a fluid-tight manner via the plastic compound arranged in the space;
wherein the coolant distributor chamber is in fluid communication with the coolant collector chamber via a plurality of further cooling ducts arranged in the plastic compound;
wherein the plurality of further cooling ducts are disposed within a tube body surrounding a tube body internal space;
wherein at least one separating element is molded on the tube body and divides the tube body internal space into a plurality of fluidically separated spaces defining the plurality of further cooling ducts;
wherein the tube body is embedded in the plastic compound and is separated from the plurality of stator windings at least via an electrical insulation; and
wherein the electrical insulation is composed of an electrically insulating material and is arranged in the space.

2. The electrical machine according to claim 1, wherein:
the stator body is ring-shaped and includes a plurality of stator teeth protruding therefrom;
the plurality of stator teeth extend along the axial direction, are arranged spaced apart from one another along a circumferential direction, and are configured to support the plurality of stator windings;
two adjacent stator teeth of the plurality of stator teeth define the space therebetween; and
the at least one stator winding is arranged in the space.

3. The electrical machine according to claim 2, wherein the at least one cooling duct is arranged in the stator body in an area between the two adjacent stator teeth with respect to a circumferential direction.

4. The electrical machine according to claim 1, wherein the at least one aperture has a rectangular geometry including two broad sides and two narrow sides in a cross section perpendicular to the axial direction.

5. The electrical machine according to claim 1, wherein at least one of the coolant distributor chamber and the coolant collector chamber is at least partially arranged in the plastic compound and delimited by the plastic compound for thermal coupling to the at least one stator winding.

6. The electrical machine according to claim 1, wherein the plastic compound protrudes axially from the space.

7. The electrical machine according to claim 1, wherein at least in the space, the plastic compound is composed of a single plastic material.

8. The electrical machine according to claim 7, wherein:
the stator body includes a plurality of stator teeth protruding therefrom, two adjacent stator teeth of the plurality of stator teeth defining the space therebetween; and
the at least one stator winding is arranged in the space and the electrical insulation is arranged in the space between the at least one stator winding and one of the two adjacent stator teeth.

9. The electrical machine according to claim 1, wherein:
the stator body includes a plurality of stator teeth protruding therefrom;
the plurality of stator teeth define a plurality of spaces including the space; and
the plurality of further cooling ducts and the plastic compound are arranged in each of the plurality of spaces.

10. The electrical machine according to claim 1, wherein the tube body is structured as a flat tube, and wherein at least one broad side of the flat tube extends essentially perpendicular to a radial direction in a cross section perpendicular to the axial direction.

11. The electrical machine according to claim 1, wherein the plastic compound is arranged on an outer circumferential side of the stator body.

12. The electrical machine according to claim 1, wherein:
the at least one stator winding protrudes axially from the space;
the plastic compound at least partially surrounds at least one winding section of the at least one stator winding and partially limits at least one of the coolant distributor chamber and the coolant collector chamber such that the at least one winding section is electrically insulated with respect to the coolant during operation.

13. The electrical machine according to claim 1, wherein:
the at least one cooling duct includes a plurality of cooling ducts; and
the plurality of cooling ducts are disposed spaced apart from one another in a circumferential direction of the stator and extend parallel to one another along the axial direction.

14. The electrical machine according to claim 1, wherein at least one of the coolant distributor chamber and the coolant collector chamber is exclusively arranged in at least one of (i) an axial extension of the stator body and (ii) an axial extension of the stator, adjacent thereto.

15. The electrical machine according to claim 1, wherein the at least one stator winding is electrically insulated from the coolant and from the stator body at least in an area inside the space during operation.

16. The electrical machine according to claim 15, wherein the at least one stator winding is electrically insulated from the stator body via at least one of (i) the plastic compound and (ii) the electrical insulation.

17. The electrical machine according to claim 1, wherein:
the stator body includes a plurality of stator teeth protruding therefrom, two adjacent stator teeth of the plurality of stator teeth defining the space therebetween; and
the electrical insulation extends over an entire axial length of the space such that the electrical insulation insulates the at least one stator winding from the stator body and from the two adjacent stator teeth defining the space.

18. The electrical machine according to claim 17, wherein the electrical insulation circumferentially surrounds the at least one stator winding inside the space over at least the entire axial length of the space.

19. The electrical machine according to claim 17, wherein the at least one stator winding is electrically insulated from the plurality of further cooling ducts via at least one of the plastic compound and the electrical insulation.

20. A vehicle, comprising at least one electrical machine according to claim 1.

21. The electrical machine according to claim 1, wherein:
the at least one aperture includes a plurality of apertures disposed adjacent to one another along a circumferential direction;
the plurality of apertures open into the space through a radially inward facing surface of the stator body; and
the at least one cooling duct includes a plurality of cooling ducts defined by the plurality of apertures.

22. An electrical machine, comprising:
a rotor rotatable about an axis of rotation which defines an axial direction;
a stator including a plurality of stator windings;
a coolant distributor chamber and a coolant collector chamber arranged at an axial distance from the coolant distributor chamber, the coolant distributor chamber, for cooling the plurality of stator windings, fluidically communicating with the coolant collector chamber via a plurality of cooling ducts through which a coolant is flowable;
at least one stator winding of the plurality of stator windings, for thermally coupling, embedded into a plastic compound composed of an electrically insulating plastic;
the stator further including a stator body having a space;
wherein the plurality of cooling ducts are arranged in the stator body and are at least partially defined by a plurality of apertures disposed in the stator body;
wherein the plurality of apertures each open towards the space and are closed in a fluid-tight manner via the plastic compound such that the plurality of cooling ducts are delimited by the stator body and the plastic compound;
wherein the plastic compound is arranged on an outer circumferential side of the stator body;
wherein the coolant distributor chamber is in fluid communication with the coolant collector chamber via a plurality of further cooling ducts arranged in the plastic compound;
wherein the plurality of further cooling ducts are disposed within a tube body surrounding a tube body internal space;
wherein at least one separating element is molded on the tube body and divides the tube body internal space into a plurality of fluidically separated spaces defining the plurality of further cooling ducts;
wherein the tube body is embedded in the plastic compound and is separated from the plurality of stator windings at least via an electrical insulation; and
wherein the electrical insulation is composed of an electrically insulating material and is arranged in the space.

23. An electrical machine, comprising:
a rotor rotatable about an axis of rotation which defines an axial direction;
a stator including a plurality of stator windings;
a coolant distributor chamber and a coolant collector chamber arranged at an axial distance from the coolant distributor chamber, the coolant distributor chamber, for cooling the plurality of stator windings, fluidically communicating with the coolant collector chamber via at least one cooling duct through which a coolant is flowable;
at least one stator winding of the plurality of stator windings, for thermally coupling, embedded into a plastic compound composed of an electrically insulating plastic;
the stator further including a stator body having a space;
wherein the at least one cooling duct is arranged in the stator body and is at least partially defined by at least one aperture disposed in the stator body;
wherein the at least one aperture opens towards the space and is closed in a fluid-tight manner via the plastic compound such that the at least one cooling duct is bounded by the stator body and the plastic compound;
wherein the at least one aperture has a rectangular geometry including two broad sides and two narrow sides in a cross section perpendicular to the axial direction;
wherein at least in the space, the plastic compound is composed of a single plastic material;
wherein the coolant distributor chamber is in fluid communication with the coolant collector chamber via a plurality of further cooling ducts arranged in the plastic compound;
wherein the plurality of further cooling ducts are disposed within a tube body surrounding a tube body internal space;
wherein at least one separating element is molded on the tube body and divides the tube body internal space into a plurality of fluidically separated spaces defining the plurality of further cooling ducts;
wherein the tube body is embedded in the plastic compound and is separated from the plurality of stator windings at least via an electrical insulation; and
wherein the electrical insulation is composed of an electrically insulating material and is arranged in the space.

* * * * *